United States Patent
Tian et al.

(10) Patent No.: US 10,801,081 B2
(45) Date of Patent: Oct. 13, 2020

(54) CLASSIFIED REDUCTION GASIFICATION IRON SMELTING PROCESS OF IRON ORE POWDER AND COAL POWDER IN A Y-TYPE ENTRAINED FLOW BED

(71) Applicant: China University of Petroleum (East China), Qingdao (CN)

(72) Inventors: Yuanyu Tian, Qingdao (CN); Yingyun Qiao, Qingdao (CN); Kechang Xie, Qingdao (CN); Jie Li, Qingdao (CN); Meng Yuan, Qingdao (CN); Jun Li, Qingdao (CN)

(73) Assignee: CHINA UNIVERSITY OF PETROLEUM (EAST CHINA), Shangdong (CN)

( * ) Notice: Subject to any disclaimer, the term of this patent is extended or adjusted under 35 U.S.C. 154(b) by 0 days.

(21) Appl. No.: 16/671,466

(22) Filed: Nov. 1, 2019

(65) Prior Publication Data
US 2020/0140966 A1    May 7, 2020

(30) Foreign Application Priority Data
Nov. 2, 2018   (CN) .......................... 2018 1 1300923

(51) Int. Cl.
*C21B 13/00*    (2006.01)
*C21B 13/02*    (2006.01)
*C21B 13/10*    (2006.01)

(52) U.S. Cl.
CPC ...... *C21B 13/0066* (2013.01); *C21B 13/0006* (2013.01); *C21B 13/023* (2013.01); *C21B 2100/00* (2013.01)

(58) Field of Classification Search
CPC ............ C21B 13/0006; C21B 13/0066; C21B 13/023
USPC .................................................. 75/499, 489
See application file for complete search history.

(56) References Cited

U.S. PATENT DOCUMENTS

| | | | | |
|---|---|---|---|---|
| 3,607,224 A | * | 9/1971 | Blaskowski | ........ C21B 13/0026 75/453 |
| 5,149,363 A | * | 9/1992 | Contrucci | ............. C21B 13/023 75/414 |

* cited by examiner

*Primary Examiner* — Tima M. McGurthry-Banks
(74) *Attorney, Agent, or Firm* — Volpe and Koenig, P.C.

(57) ABSTRACT

A classified reduction gasification iron smelting process of iron ore powder and coal powder in a Y-type entrained flow bed. The process comprises the following steps: uniformly mixing the pre-reduced hot iron ore powder with the coal powder, and introducing the mixture, a gasification agent and water vapor into a Y-type entrained flow bed for performing combustion, gasification and reduction reaction to obtain crude syngas and molten iron; the crude syngas is used for sucking iron ore powder to enter a riser to perform preheating and partial reduction.

5 Claims, 1 Drawing Sheet

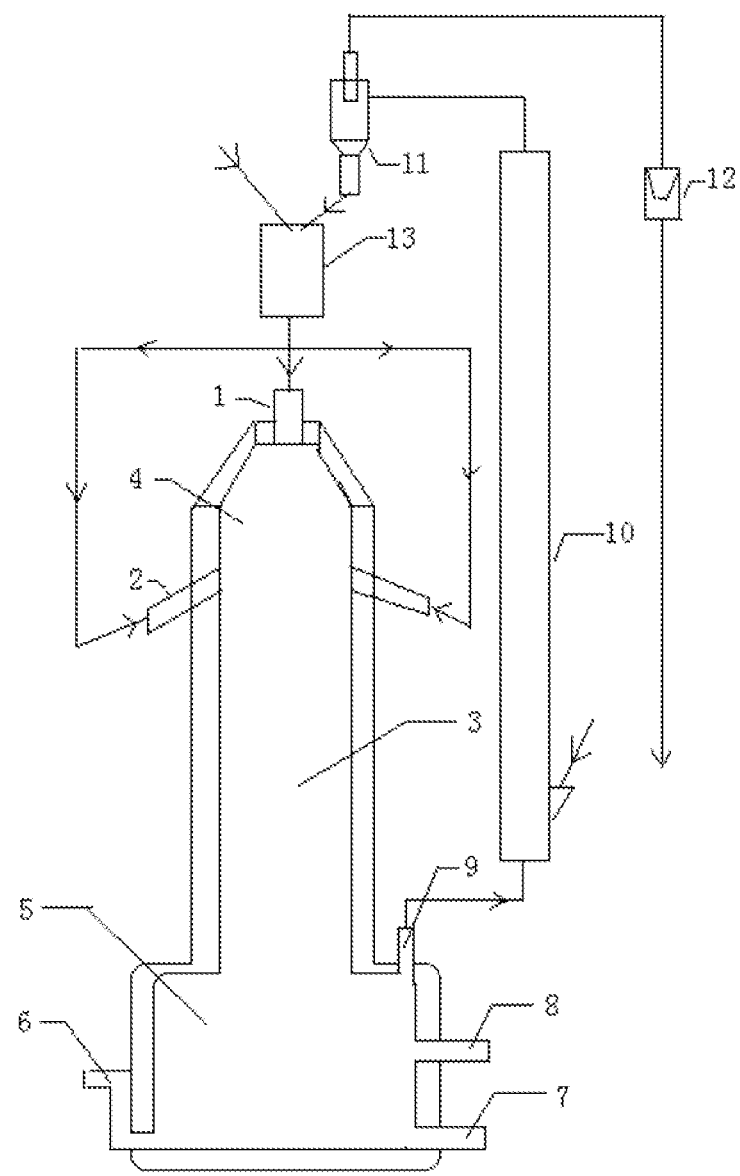

CLASSIFIED REDUCTION GASIFICATION IRON SMELTING PROCESS OF IRON ORE POWDER AND COAL POWDER IN A Y-TYPE ENTRAINED FLOW BED

CROSS REFERENCE TO RELATED APPLICATIONS

The application claims priority to Chinese Application No. 201811300923.3, filed on Nov. 2, 2018, entitled "Iron ore powder and coal powder Y type entrained-flow bed classified reduction gasification iron smelting process", which is herein specifically and entirely incorporated by reference.

FIELD

The present disclosure relates to the technical field of non-coke iron smelting, and specifically to classified reduction gasification iron smelting process of iron ore powder and coal powder in a y-type entrained flow bed.

BACKGROUND

The traditional shaft furnace iron smelting process has a history of nearly a thousand years, which has reached a fairly mature level. It currently accounts for more than 95% of the iron production in the world.

However, although the process has become increasingly perfect and large-scale, it has the defects such as long flow process, a large amount of investment, and needs to consume of a plenty of coke. The coke production process consumes a large amount of high-quality coal, and causes serious environmental pollution problems such as generating a large amount of benzopyrene, dioxins, SOx, NOx and dust. In addition, the blast furnace iron smelting process has an excessive dependent on the metallurgical coke, however, in term of the currently proven coal reserve in the world, coking coal only accounts for 5% of the proven reserve, and its distribution is fairly uneven. Therefore, the high-quality coal is also constrained by natural resources, such a situation has spawned the non-coke iron smelting technology.

The developed non-coke iron smelting process includes: smelting reduction iron smelting technology and direct reduction iron smelting technology. The smelting reduction iron smelting technology relates to replacing coke with coal and iron smelting through a direct use of ore fines, thus it neither requires a coking process, nor needs the sintering plant or pelletizing plant, it simplifies the iron smelting process with a purpose of replacing the blast furnace, it has been the development direction of iron smelting technology. However, the existing smelting reduction iron smelting process uses a shaft furnace as a reduction furnace or a final reduction furnace, and it is necessary to mold the iron ore powder and coal powder into pellets. The use of a shaft furnace applied as a fixed bed reactor has some problems, namely it is difficult to expand into a large-scale plant, the flow process is long, and the investment amount is high.

Therefore, it is urgently required to provide an improved non-coke iron smelting process.

SUMMARY

To solve the technical problems of using a shaft furnace in the current smelting reduction iron smelting technology, the present disclosure provides a classified reduction gasification iron smelting process of iron ore powder and coal powder in a y-type entrained flow bed. The process not only has a high production efficiency, strong processing capacity of the plant, reduced production cost of iron, decreased energy consumption, but also demonstrates the benefits in the aspects of simple equipment, a small amount of investment, and the rationally utilized tail gas.

In order to fulfill the above-mentioned purpose, the present disclosure provides a classified reduction gasification iron smelting process of iron ore powder and coal powder in a y-type entrained flow bed, which comprises the following steps:

(1) uniformly mixing a pre-reduced hot iron ore powder based on $Fe_2O_3$ and the coal powder based on carbon according to the molar ratio 1:1.1-4 of $C:Fe_2O_3$ to obtain a mixture of pulverized iron ore and coal, and delivering the mixture to a powder silo;

(2) spraying the mixture of pulverized iron ore and coal, a gasification agent and water vapor into a gasification segment respectively through a top nozzle and a plurality of radially tilted side nozzles disposed in a gasification furnace in a Y-type entrained flow bed, and performing combustion and gasification at a temperature of 1,500-1,800° C. to produce crude syngas and slag;

wherein, during the combustion and gasification process, the mixture of pulverized iron ore and coal, the gasification agent and water vapor sprayed from the top nozzle and the side nozzles collide, ignite and turbulently mix with each other at a combustion chamber center of the gasification segment to form a rotational strike and high temperature reaction zone; a residual ash-slag generated in the combustion and gasification process is thrown toward the furnace wall of the gasification segment and swirled downward, the residence time of the residual ash-slag in the rotational strike and high temperature reaction zone is 10 s or more; and the residual ash is solidified on the water-cooled wall of the gasification segment to form a slag layer;

(3) flowing the crude syngas and slagging to a slag-iron separation segment through a gasification product exhaust port disposed at a center of the conical head of the gasification segment;

the unreacted iron ore powder and coal powder in the slag are further subjected to a reduction reaction in the slag-iron separation segment to obtain molten iron and CO, and the slag subjects to a sedimentation and separation process to separate molten iron and iron slag, wherein the iron slag is discharged through a slag outlet, and the molten iron is discharged via a siphonic molten iron outlet;

the crude syngas is discharged from a coal gas outlet disposed at the top of the slag-iron separation segment, the crude syngas has a temperature of 1,500-1,800° C.;

(4) sucking a raw material iron ore powder to enter a riser to perform preheating, drying and partial reduction by the crude syngas discharged from the step (3); the pre-reduced hot iron ore powder is separated from the top of the riser, and returned back to the step (1) so as to mix with the coal powder; the tail gas separated from the riser is purified and then supplemented for combustion, and the waste heat is recovered and utilized.

Through the above technical solution, the present disclosure provides a process for performing non-coke iron smelting in a Y-type entrained flow bed, which can directly utilize iron ore powder and coal powder for producing iron, thereby completely eliminates the coking and pellet sintering process, avoids an investment of the coking plant, and eliminate the coking pollution. The top nozzle and the side nozzles in the Y-type entrained flow bed form a Y-type arrangement, which is conducive to allow the injected materials to form a stable and large rotational strike and high temperature reaction zone in the combustion chamber center of the gasification segment contained in the Y-type entrained flow bed, such that the reduction strength of the iron ore powder is improved, and the operational flexibility and anti-risk capability of the Y-type entrained flowbed are enhanced.

In a rotational strike and high temperature reaction zone formed in the gasification segment, the rotary flow field is beneficial to adhering slag on the furnace wall of the gasification segment, prolonging the service life of the gasification segment; in addition, the iron ore powder subjects to efficient and long-term reduction, thus the reduction rate of the iron ore powder is increased.

The water-cooled wall structure contained in the gasification segment is coil cooling or jacket cooling, which can ensure a low failure rate of the equipment, reduce cost of the furnace lining, carry out a large-scale production, and provide convenience for co-generation and casting and electric steelmaking; the flow process is short, the cost is low, and the operation is easy.

The disclosure utilizes the crude syngas discharged from the slag-iron separation segment to suck the raw material iron ore powder into the riser so as to perform preheating, drying and partial reduction, thereby improving the utilization ratio of coal and CO, sufficiently utilizing the sensible heat and chemical energy of the high temperature coal gas, and alleviating the load of the gasification segment, and lifting and transporting the material iron ore powder.

BRIEF DESCRIPTION OF THE DRAWINGS

FIG. 1 is a schematic view showing the flow process and apparatus structure of an iron smelting process provided by the present disclosure.

DESCRIPTION OF THE REFERENCE SIGNS

| 1. | top nozzle | 2. | side nozzle | 3. | gasification furnace |
|---|---|---|---|---|---|
| 4. | gasification segment | 5. | slag-iron separation segment | 6. | siphonic molten iron outlet |
| 7. | emergency treatment port | 8. | slag outlet | 9. | coal gas outlet |
| 10. | riser | 11. | top separator | 12. | induced draft fan |
| 13. | powder silo | | | | |

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to yield one or more new numerical ranges, which should be considered as specifically disclosed herein.

The present disclosure provides a classified reduction gasification iron smelting process of iron ore powder and coal powder in a y-type entrained flow bed, which comprise the following steps:

(1) uniformly mixing a pre-reduced hot iron ore powder based on $Fe_2O_3$ and the coal powder based on carbon according to the molar ratio 1:1.1-4 of $C:Fe_2O_3$ to obtain a mixture of pulverized iron ore and coal, and delivering the mixture to a powder silo;

(2) spraying the mixture of pulverized iron ore and coal, a gasification agent and water vapor into a gasification segment respectively through a top nozzle and a plurality of radially tilted side nozzles disposed in a gasification furnace in a Y-type entrained flow bed, and performing combustion and gasification at a temperature of 1,500-1,800° C. to produce crude syngas and slag;

wherein, during the combustion and gasification process, the mixture of pulverized iron ore and coal, the gasification agent and water vapor sprayed from the top nozzle and the side nozzles collide, ignite and turbulently mix with each other at a combustion chamber center of the gasification segment to form a rotational strike and high temperature reaction zone; a residual ash-slag generated in the combustion and gasification process is thrown toward the furnace wall of the gasification segment and swirled downward, the residence time of the residual ash-slag in the rotational strike and high temperature reaction zone is 10 s or more; and the residual ash is solidified on the water-cooled wall of the gasification segment to form a slag layer;

(3) flowing the crude syngas and slagging to a slag-iron separation segment through a gasification product exhaust port disposed at a center of the conical head of the gasification segment;

the unreacted iron ore powder and coal powder in the slag are further subjected to a reduction reaction in the slag-iron separation segment to obtain molten iron and CO, and the slag subjects to a sedimentation and separation process to separate molten iron and iron slag, wherein the iron slag is discharged through a slag outlet, and the molten iron is discharged via a siphonic molten iron outlet;

the crude syngas is discharged from a coal gas outlet disposed at the top of the slag-iron separation segment, the crude syngas has a temperature of 1,500-1,800° C.;

(4) sucking a raw material iron ore powder to enter a riser to perform preheating, drying and partial reduction by the crude syngas discharged from the step (3); the pre-reduced hot iron ore powder is separated from the top of the riser, and returned back to the step (1) so as to mix with the coal powder; the tail gas separated from the riser is purified and then supplemented for combustion, and the waste heat is recovered and utilized.

In an embodiment provided by the present disclosure, preferably, the gasification agent is oxygen, air, or oxygen-enriched air containing not less than 21% by volume of oxygen.

In an embodiment provided by the present disclosure, the weight ratio of the mixture of pulverized iron ore and coal, the gasification agent and the water vapor is 1,000:(48-144):(40-80).

In an embodiment provided by the present disclosure, preferably, as shown in the accompanying FIGURE, the Y-type entrained flow bed comprises: a gasification furnace 3 disposed vertically at an upper portion, and a slag-iron separation segment 5 disposed horizontally at a lower portion; the gasification furnace 3 is internally communicating with the slag-iron separation segment 5, and a gasification segment 4 is disposed in the gasification furnace 3;

a down-draft top nozzle 1 is arranged at a top of the gasification segment 4, three or more side nozzles 2 are disposed at an upper portion of the gasification segment 4 along a circumferential direction; the water-cooling wall of the gasification segment 4 comprises a refractory lining layer;

the top of the slag-iron separation segment 5 is provided with a coal gas outlet 9, the bottom of the slag-iron separation segment 5 is provided with a slag outlet 8, a siphon outlet tap 6 and an emergency treatment port 7; the emergency treatment port 7 is used to ensure emptying during shutdown or an emergency situation; the slag-iron separation segment 5 is provided with a thermal insulation lining.

In an embodiment provided by the present disclosure, preferably, the arrangement condition of the radially tilted side nozzles comprises: an included angle between an axial direction of the side nozzle and an axial direction of the gasification segment is within a range of 75°-90°; the central axis of the side nozzles is not coplanar with the central axis of the gasification segment, a central axis of the side nozzles is offset from a section passing through an intersection point between the central axis of the side nozzles and the circumference of said gasification segment by an angle ranging from 5°-75°. Wherein, the side nozzles may be tilted and stretched upward from the side wall of the gasification furnace, or may be tilted and stretched downward from the side wall of the gasification furnace. Wherein, "a section passing through an intersection point between the central axis of the side nozzles and the circumference of said gasification furnace" refers to the section is the longitudinal section of the gasification furnace, it passes through a central axis of the gasification furnace, and an intersection point between the central axis of the side nozzles and the circumference of the gasification furnace. Wherein, the central axis of the side nozzles may be disposed at the horizontal direction, or may be offset from the section leftward or rightward.

In the present disclosure, a mixture of the mixture of pulverized iron ore and coal, the gasifying agent and the water vapor according to the above weight ratio is sprayed from each of the top nozzle and the side nozzles, the amount and composition of the materials sprayed through the nozzles are controlled to be identical.

The present disclosure provides a device for performing non-coke iron smelting by using a Y-type entrained flow bed as shown in the accompanying FIGURE:

the device comprises a Y-type entrained flow bed, a riser 10, a powder silo 13, a top separator 11 and an induced draft fan 12;

wherein, the Y-type entrained flow bed comprises a vertically disposed gasification furnace 3 and a horizontally disposed slag-iron separation segment 5, the gasification furnace 3 is arranged above the slag-iron separation segment 5, and the gasification furnace 3 is internally communicated with the slag-iron separation segment 5. A gasification segment 4 is disposed in the gasification furnace 3, the top of the gasification furnace 3 is provided with a top nozzle 1, the side wall of the gasification furnace 3 is provided with a plurality of side nozzles 2 along the circumferential direction; the side nozzles 2 are disposed at an upper portion of the gasification furnace 3, the upper portion refers to a portion of the gasification furnace 3 in the vertical direction from a half height to the top. The upper part of the slag-iron separation segment 5 is provided with a coal gas outlet 9, the middle portion of the slag-iron separation segment 5 is provided with a slag outlet 8 and a siphonic molten iron outlet 6, and the bottom of the slag-iron separation segment 5 is arranged with an emergency treatment port 7;

the coal gas outlet 9 is communicated with the bottom of the riser 10 for allowing the crude syngas discharged from the coal gas outlet 9 to lift the raw material iron ore powder to perform preheating, drying and partial reduction; the top of the riser 10 is connected with a top separator 11 such that the pre-reduced hot iron ore powder and tail gas discharged from the riser 10 pass through a top separator 11 to perform solid-gas separation; the top separator 11 is connected with an induced draft fan 12 and a powder silo 13, the tail gas separated from the top separator 11 is discharged via the induced draft fan 12, the tail gas is purified and then supplemented for combustion, and the waste heat is recovered and utilized; the pre-reduced hot iron ore powder separated from the top separator 11 mixes with the coal powder to obtain a mixture of pulverized iron ore and coal, which enters into the powder silo 13; the powder silo 13 is communicated with the top nozzle 1 and the side nozzles 2, wherein the top nozzle 1 and the side nozzles 2 are used for ejecting the mixture of pulverized iron ore and coal, the gasification agent and the water vapor into the gasification segment 4 to perform combustion and gasification.

With reference to the accompanying FIGURE, the process provided by the present disclosure comprises the following operations:

uniformly mixing a pre-reduced hot iron ore powder with the coal powder according to the molar ratio 1:1.1-4.0 of $C:Fe_2O_3$ to obtain a mixture of pulverized iron ore and coal, and delivering the mixture to a powder silo 13;

spraying a mixture of pulverized iron ore and coal from the powder silo 13, the gasification agent and the water vapor into a gasification segment 4 through a top nozzle 1 and three or more radially tilted side nozzles 2 disposed in a gasification furnace 3 in a Y-type entrained flow bed, and performing combustion and gasification at a temperature of 1,500-1,800° C. to produce crude syngas and slag;

wherein, during the combustion and gasification process, a plurality of jet flows (consisting of a mixture of pulverized iron ore and coal, a gasifying agent and a water vapor, the compositions of the jet flows ejected from each nozzle are identical) spray from top nozzle 1 and side nozzles 2, collide, ignite and turbulently mix with each other at a combustion chamber center of the gasification segment 4 to form a rotational strike and high temperature reaction zone (the side nozzles 2 may be arranged to be radially tilted, the ejected materials may form a plurality of rotating jet flows, and the down-draft top nozzle 1 ejects a flow jet downward, a plurality of flow jets rotate and collide, and performs an ignition and turbulent stirring and mixing simultaneously to carry out a high-temperature reaction, thereby forming a rotational strike and high temperature reaction zone in the furnace chamber center of the gasification segment 4, in which a plurality of flow jets participate the rotational strike and high temperature reaction that occurs simultaneously); the residual ash-slag generated in the combustion and gasification process is thrown toward the furnace wall of the gasification segment 4 and swirled downward, the residence time of the residual ash-slag in the rotational strike and high temperature reaction zone is 10 s or more (the conventional residence time in the prior art is about 0.25 s, and the residence time in the disclosure is extended by 10 times or more); in addition, the residual ash is solidified on a surface of the refractory layer contained in a water-cooled wall of the gasification segment 4 to form a slag layer; which increases the anti-erosion of the gasification segment 4 against the residual ash, thereby extending the service life of the gasification segment 4;

flowing the crude syngas and slag to a slag-iron separation segment 5 through a gasification product exhaust port disposed at a center of the conical head of the gasification segment 4;

the unreacted iron ore powder and coal powder in the slag subject to heat preservation and further reduction in the slag-iron separation segment 5 to obtain molten iron and CO, and the slag subjects to sedimentation and separation process to separate out the molten iron and iron slag, wherein the iron slag is discharged through a slag outlet 8, and the molten iron is discharged via a siphonic molten iron outlet 6, in addition, the interface height of the molten iron-iron slag in the slag-iron separation segment 5 is maintained stable; the crude syngas is discharged from a coal gas outlet 9 disposed at the top of the slag-iron separation segment 5, the crude syngas has a temperature of 1,500-1,800° C.;

the discharged crude syngas sucks the raw material iron ore powder into a riser 10 to perform preheating, drying and partial reduction; the materials discharged from the top of the riser 10 enter into the top separator 11 to carry out the gas-solid separation, the pre-reduced hot iron ore powder separated from the top separator 11 mixes with coal powder to form a mixture of pulverized iron ore and coal, the mixture is delivered to a powder silo 13; the tail gas separated from the top separator 11 is extracted by an induced draft fan 12, the tail gas is purified and then supplemented for combustion, and the waste heat is recovered and utilized.

The disclosure will be elaborated below by means of examples.

Example 1

The iron smelting is carried out in a Y-type entrained flow bed as shown in the accompanying FIGURE, wherein an included angle between an axial direction of the side nozzle 2 and an axial direction of the gasification segment 4 is 85° (the side nozzle 2 extends upward from a side wall of the gasification segment 4); the central axis of the side nozzle 2 is not coplanar with the central axis of the gasification segment 4, a central axis of the side nozzle 2 is leftward offset from a section passing through an intersection between the central axis of the side nozzle 2 and the circumference of said gasification segment 4 by an angle of 5°;

(1) uniformly mixing the pre-reduced hot iron ore powder based on $Fe_2O_3$ and the coal powder based on carbon according to the molar ratio 1:1.1 of C:$Fe_2O_3$ to obtain a mixture of pulverized iron ore and coal, and delivering the mixture to a powder silo;

(2) spraying the mixture of pulverized iron ore and coal, a gasification agent and water vapor into a gasification segment respectively through a top nozzle and a plurality of radially tilted side nozzles disposed in a gasification furnace in a Y-type entrained flow bed according to the weight ratio 1000:144:40 of the mixture of pulverized iron ore and coal, the gasification agent and the water vapor, and performing combustion and gasification at a temperature of 1,800° C. to produce crude syngas and slag;

wherein, the mixture of pulverized iron ore and coal, the gasification agent and the water vapor are respectively ejected from the top nozzle and the side nozzles, and collide, ignite and turbulently mix with each other at the combustion chamber center of the gasification segment to form a rotational strike and high temperature reaction zone; the residual ash-slag generated in the combustion and gasification process is thrown toward the furnace wall of the gasification segment and swirled downward, the residence time of the residual ash-slag in the rotational strike and high temperature reaction zone is 50 s or more, which is extended 10 times or more than the residence time 5 s obtained from the ordinary entrained flow gasification; and the residual ash is solidified on a surface of the refractory layer contained in a water-cooled wall of the gasification segment to form a slag layer, such that the formed slag layer may withstand the erosion of residual ash;

(3) flowing the crude syngas and slag to a slag-iron separation segment through a gasification product exhaust port disposed at a center of the conical head of the gasification segment; the unreacted iron ore powder and coal powder in the slag are subjected to heat preservation and further reduction reaction in the slag-iron separation segment to obtain molten iron and CO, and the slag subjects to a sedimentation and separation process to separate out the molten iron and iron slag, wherein the iron slag is discharged through a slag outlet, and the molten iron is discharged via a siphonic molten iron outlet;

the crude syngas is discharged from a coal gas outlet disposed at the top of the slag-iron separation segment, and the temperature of the crude syngas is 1800° C.;

(4) the crude syngas sucks the raw material iron ore powder to enter a riser to perform preheating, drying and partial reduction; the pre-reduced hot iron ore powder is separated from the top of the riser, and returns to the step (1) so as to mix with the coal powder; the tail gas separated from the riser is purified and then supplemented for combustion, and the waste heat is recovered and utilized.

Compared with the conventional ordinary entrained flow gasification, the iron smelting carried out in a Y-type entrained flow bed brings forth many benefits, namely the production cost for 1 ton of iron is reduced by 45% or more, the energy consumption is reduced by more than 30%, and the pollutant discharge problem is completely eliminated.

Example 2

The iron smelting is carried out in a Y-type entrained flow bed as shown in the accompanying FIGURE, wherein an included angle between an axial direction of the side nozzle 2 and an axial direction of the gasification segment 4 is 75° (the side nozzle 2 extends upward from a side wall of the gasification segment 4); the central axis of the side nozzle 2 is not coplanar with the central axis of the gasification segment 4, a central axis of the side nozzle 2 is rightward offset from a section passing through an intersection between the central axis of the side nozzle 2 and the circumference of said gasification segment 4 by an angle of 65°;

(1) uniformly mixing the pre-reduced hot iron ore powder based on $Fe_2O_3$ and the coal powder based on carbon according to the molar ratio 1:2 of C:$Fe_2O_3$ to obtain a mixture of pulverized iron ore and coal, and delivering the mixture to a powder silo;

(2) spraying the mixture of pulverized iron ore and coal, a gasification agent and water vapor into a gasification segment respectively through a top nozzle and a plurality of radially tilted side nozzles disposed in a gasification furnace in a Y-type entrained flow bed according to the weight ratio 1000:48:80 of the mixture of pulverized iron ore and coal, the gasification agent and the water vapor, and performing combustion and gasification at a temperature of 1,500° C. to produce crude syngas and slag;

wherein, the mixture of pulverized iron ore and coal, the gasification agent and the water vapor are respectively ejected from the top nozzle and the side nozzles, and collide, ignite and turbulently mix with each other at the combustion chamber center of the gasification segment to form a rotational strike and high temperature reaction zone; the residual ash-slag generated in the combustion and gasification process is thrown toward the furnace wall of the gasification segment and swirled downward, the residence time of the residual ash-slag in the rotational strike and high temperature reaction zone is 150 s or more, which is extended 30 times or more than the residence time 5 s obtained from the ordinary entrained flow bed; and the residual ash is solidified on a surface of the refractory layer contained in a water-cooled wall of the gasification segment to form a slag layer, such that the formed slag layer may withstand the erosion of residual ash;

(3) flowing the crude syngas and slag to a slag-iron separation segment through a gasification product exhaust port disposed at a center of the conical head of the gasification segment; the unreacted iron ore powder and coal powder in the slag are subjected to heat preservation and further reduction reaction in the slag-iron separation segment to obtain molten iron and CO, and the slag subjects to a sedimentation and separation process to separate out the molten iron and iron slag, wherein the iron slag is discharged through a slag outlet, and the molten iron is discharged via a siphonic molten iron outlet;

the crude syngas is discharged from a coal gas outlet disposed at the top of the slag-iron separation segment, and the temperature of the crude syngas is 1500° C.;

(4) the crude syngas sucks the raw material iron ore powder to enter a riser to perform preheating, drying and partial reduction; the pre-reduced hot iron ore powder is separated from the top of the riser, and returns to the step (1) so as to mix with the coal powder; the tail gas separated from the riser is purified and then supplemented for combustion, and the waste heat is recovered and utilized.

Compared with the conventional ordinary entrained flow gasification, the iron smelting carried out in a Y-type entrained flow bed brings forth many benefits, namely the production cost for 1 ton of iron is reduced by 50% or more, the energy consumption is reduced by more than 35%, and the pollutant discharge problem is completely eliminated.

Example 3

The iron smelting is carried out in a Y-type entrained flow bed as shown in the accompanying FIGURE, wherein an included angle between an axial direction of the side nozzle 2 and an axial direction of the gasification segment 4 is 50° (the side nozzle 2 extends upward from a side wall of the gasification segment 4); the central axis of the side nozzle 2 is not coplanar with the central axis of the gasification segment 4, a central axis of the side nozzle 2 is rightward offset from a section passing through an intersection between the central axis of the side nozzle 2 and the circumference of said gasification segment 4 by an angle of 15°;

(1) uniformly mixing the pre-reduced hot iron ore powder based on $Fe_2O_3$ and the coal powder based on carbon according to the molar ratio 1:4 of $C:Fe_2O_3$ to obtain a mixture of pulverized iron ore and coal, and delivering the mixture to a powder silo;

(2) spraying the mixture of pulverized iron ore and coal, a gasification agent and water vapor into a gasification segment respectively through a top nozzle and a plurality of radially tilted side nozzles disposed in a gasification furnace in a Y-type entrained flow bed according to the weight ratio 1000:112:60 of the mixture of pulverized iron ore and coal, the gasification agent and the water vapor, and performing combustion and gasification at a temperature of 1,600° C. to produce crude syngas and slag;

wherein, the mixture of pulverized iron ore and coal, the gasification agent and the water vapor are respectively ejected from the top nozzle and the side nozzles, and collide, ignite and turbulently mix with each other at the combustion chamber center of the gasification segment to form a rotational strike and high temperature reaction zone; the residual ash-slag generated in the combustion and gasification process is thrown toward the furnace wall of the gasification segment and swirled downward, the residence time of the residual ash-slag in the rotational strike and high temperature reaction zone is 80 s or more, which is extended 16 times or more than the residence time 5 s obtained from the ordinary entrained flow gasification; and the residual ash is solidified on a surface of the refractory layer contained in a water-cooled wall of the gasification segment to form a slag layer, such that the formed slag layer may withstand the erosion of residual ash;

(3) flowing the crude syngas and slag to a slag-iron separation segment through a gasification product exhaust port disposed at a center of the conical head of the gasification segment; the unreacted iron ore powder and coal powder in the slag are subjected to heat preservation and further reduction reaction in the slag-iron separation segment to obtain molten iron and CO, and the slag subjects to a sedimentation and separation process to separate out the molten iron and iron slag, wherein the iron slag is discharged through a slag outlet, and the molten iron is discharged via a siphonic molten iron outlet;

the crude syngas is discharged from a coal gas outlet disposed at the top of the slag-iron separation segment, and the temperature of the crude syngas is 1600° C.;

(4) the crude syngas sucks the raw material iron ore powder to enter a riser to perform preheating, drying and partial reduction; the pre-reduced hot iron ore powder is separated from the top of the riser, and returns to the step (1) so as to mix with the coal powder; the tail gas separated from the riser is purified and then supplemented for combustion, and the waste heat is recovered and utilized.

Compared with the conventional ordinary entrained flow gasification, the iron smelting carried out in a Y-type entrained flow bed brings forth many benefits, namely the production cost for 1 ton of iron is reduced by 48% or more, the energy consumption is reduced by more than 32%, and the pollutant discharge problem is completely overcome.

Through the above embodiments, it shows that the process provided by the disclosure can be utilized for iron smelting by directly using the iron ore powder and the coal powder, completely eliminating the coking and pellet sintering process, and avoiding an investment of the coking plant and eliminating the coking pollution.

In the gasification furnace contained in the Y-type entrained flow bed, the top nozzle and the side nozzles are disposed to form a Y-shaped arrangement, which is favorable for formation of a stable and large rotational strike and high temperature reaction zone, thereby improving reduction strength of the iron ore powder the operational flexibility of the device, and enhancing the anti-risk capability. In the gasification segment contained in the gasification furnace, the rotating flow field formed by a plurality of flow jets is beneficial to the efficient and long-term reduction of the adhering slag and iron ore powder, prolong the service life of the gasification furnace and increase the reduction ratio of the iron ore powder. The water-cooled wall structure contained in the gasification segment ensures a low failure rate of the equipment, reduces cost of the furnace lining, carries out a large-scale production, and provides convenience for co-generation and casting and electric steelmaking; the flow process is short, the cost is low, and the operation is easy.

The produced crude syngas is used for preheating, drying and pre-reduction of iron ore powder, thereby improve the utilization rate of coal and CO, reduce the load of the gasification furnace; moreover, the riser is utilized for pre-heating, drying and pre-reduction of the iron ore powder with the high temperature coal gas, it can make full use of the sensible heat and chemical energy of the high temperature coal gas, and simultaneously perform lifting and transporting of iron ore powder.

The above content describes in detail the preferred embodiments of the present disclosure, but the disclosure is not limited thereto. A variety of simple modifications can be made to the technical solutions of the disclosure within the scope of the technical concept of the disclosure, including a combination of individual technical features in any other suitable manner, such simple modifications and combinations thereof shall also be regarded as the content disclosed by the present disclosure, each of them falls into the protection scope of the present disclosure.

What is claimed is:

1. A classified reduction gasification iron smelting process of iron ore powder and coal powder in a Y-type entrained flow bed, comprising the following steps:
   (1) uniformly mixing a pre-reduced iron ore powder based on $Fe_2O_3$ and the coal powder based on carbon according to the molar ratio 1:1.1-4 of $C:Fe_2O_3$ to obtain a mixture of pulverized iron ore and coal, and delivering the mixture to a powder silo;
   (2) spraying the mixture of pulverized iron ore and coal, a gasification agent and water vapor into a gasification segment respectively through a top nozzle and a plurality of radially tilted side nozzles disposed in a gasification furnace in the Y-type entrained flow bed, and performing combustion and gasification at a temperature of 1,500-1,800° C. to produce crude syngas and slag;
   wherein, during the combustion and gasification, the mixture of pulverized iron ore and coal, the gasification agent and water vapor sprayed from the top nozzle and the side nozzles collide, ignite and turbulently mix with each other at a combustion chamber center of the gasification segment to form a rotational strike and reaction zone; a residual ash-slag generated in the combustion and gasification is thrown toward the furnace wall of the gasification segment and swirled downward, the residual ash-slag having a residence time in the rotational strike and reaction zone of 10 s or more; and the residual ash is solidified on a water-cooled wall of the gasification segment to form a slag layer;
   (3) flowing the crude syngas and slag to a slag-iron separation segment through a gasification product exhaust port disposed at a center of a conical head of the gasification segment;
   unreacted iron ore powder and coal powder in the slag are further subjected to a reduction reaction in the slag-iron separation segment to obtain molten iron and CO, and the slag subjects to a sedimentation and separation process to separate molten iron and iron slag, wherein the iron slag is discharged through a slag outlet, and the molten iron is discharged via a siphonic molten iron outlet;
   the crude syngas is discharged from a coal gas outlet disposed at the top of the slag-iron separation segment, the crude syngas has a temperature of 1,500-1,800° C.; and
   (4) sucking a raw material iron ore powder to enter a riser to perform preheating, drying and partial reduction by the crude syngas discharged from the step (3); pre-reduced iron ore powder is separated from the top of the riser, and returned back to the step (1) so as to mix with the coal powder; the tail gas separated from the riser is purified and then supplemented for combustion, and the waste heat is recovered and utilized.

2. The process according to claim 1, wherein the gasification agent is oxygen, air, or oxygen-enriched air containing not less than 21% by volume of oxygen.

3. The process according to claim 1, wherein the weight ratio of the mixture of pulverized iron ore and coal, the gasification agent and the water vapor is 1,000:(48-144):(40-80).

4. The process according to claim 1, wherein the Y-type entrained flow bed comprises: a gasification furnace disposed vertically at an upper portion, and a slag-iron separation segment disposed horizontally at a lower portion; the gasification furnace is internally communicating with the slag-iron separation segment, and a gasification segment is disposed in the gasification furnace;
   a down-draft top nozzle is arranged at a top of the gasification segment, three or more side nozzles are disposed at an upper portion of the gasification segment along a circumferential direction; the water-cooling wall of the gasification segment comprises a refractory lining layer;
   the top of the slag-iron separation segment is provided with a coal gas outlet, the bottom of the slag-iron separation segment is provided with a slag outlet, a siphon outlet tap and an emergency treatment port; the emergency treatment port is used to ensure emptying during shutdown or an emergency situation; the slag-iron separation segment is provided with a thermal insulation lining.

5. The process according to claim 1, wherein the radially tilted side nozzles comprises an arrangement condition comprising: an included angle between an axial direction of the side nozzle and an axial direction of the gasification segment is within a range of 75°-90°; the central axis of the side nozzles is not coplanar with the central axis of the gasification segment, a central axis of the side nozzles is offset from a section passing through an intersection point between the central axis of the side nozzles and the circumference of said gasification segment by an angle ranging from 5°-75°.

* * * * *